(12) United States Patent
Prestl et al.

(10) Patent No.: US 6,192,309 B1
(45) Date of Patent: Feb. 20, 2001

(54) DISTANCE-RELATED ELECTRONICALLY CONTROLLED CRUISE CONTROL SYSTEM

(75) Inventors: Willibald Prestl, Eichenau; Joachim Steinle; Oliver Tschernoster, both of Munich, all of (DE)

(73) Assignee: Bayerische Motoren Werke Aktiengesellschaft, Munich (DE)

( * ) Notice: Under 35 U.S.C. 154(b), the term of this patent shall be extended for 0 days.

(21) Appl. No.: 09/216,951

(22) Filed: Dec. 21, 1998

(30) Foreign Application Priority Data

Dec. 20, 1997 (DE) ................................. 197 57 062

(51) Int. Cl.[7] .............................. G06F 7/00; G06F 17/00
(52) U.S. Cl. ............................. 701/93; 701/96; 340/903; 180/170
(58) Field of Search ......................... 701/93, 96, 223, 701/301; 340/903; 180/169, 170, 175, 176

(56) References Cited

U.S. PATENT DOCUMENTS

| | | | |
|---|---|---|---|
| 5,230,400 | * 7/1993 | Kakinami et al. | 180/169 |
| 5,309,137 | * 5/1994 | Kajiwara | 340/436 |
| 5,629,851 | * 5/1997 | Williams et al. | 701/96 |
| 5,631,639 | * 5/1997 | Hibino et al. | 340/903 |
| 5,771,481 | * 6/1998 | Gilling | 701/93 |
| 5,839,534 | * 11/1998 | Chakraborty et al. | 180/169 |

FOREIGN PATENT DOCUMENTS 0 716 949 * 6/1996 (EP) .

OTHER PUBLICATIONS

Japanese Abstract No. 6–199148, M–1692, Oct. 25, 1994, vol. 18, No. 559.*

* cited by examiner

Primary Examiner—William A. Cuchlinski, Jr.
Assistant Examiner—Gertrude Arthur
(74) Attorney, Agent, or Firm—Evenson, McKeown, Edwards & Lenahan, P.L.L.C.

(57) ABSTRACT

In a distance-related electronically controlled cruise control system for motor vehicles, in which, during a first regulating operation, a predetermined speed is essentially maintained until a preset minimum distance from a leading target vehicle is reached or undershot, and in which, during a second regulating operation, following the reaching or undershooting of this preset minimum distance, a speed regulation takes place in such fashion that the set minimum distance is maintained by following the target vehicle ahead at a regulated distance, and in the event of detection of a standing object ahead of the target vehicle traveling ahead of the source vehicle during the second regulating operation, after the previously leading target vehicle veers aside thus causing a transition from the second regulating operation back to the first regulating operation, acceleration to the preset speed is prevented if the distance to the standing object is below a first threshold and/or if the actual speed is below a second threshold.

6 Claims, 1 Drawing Sheet

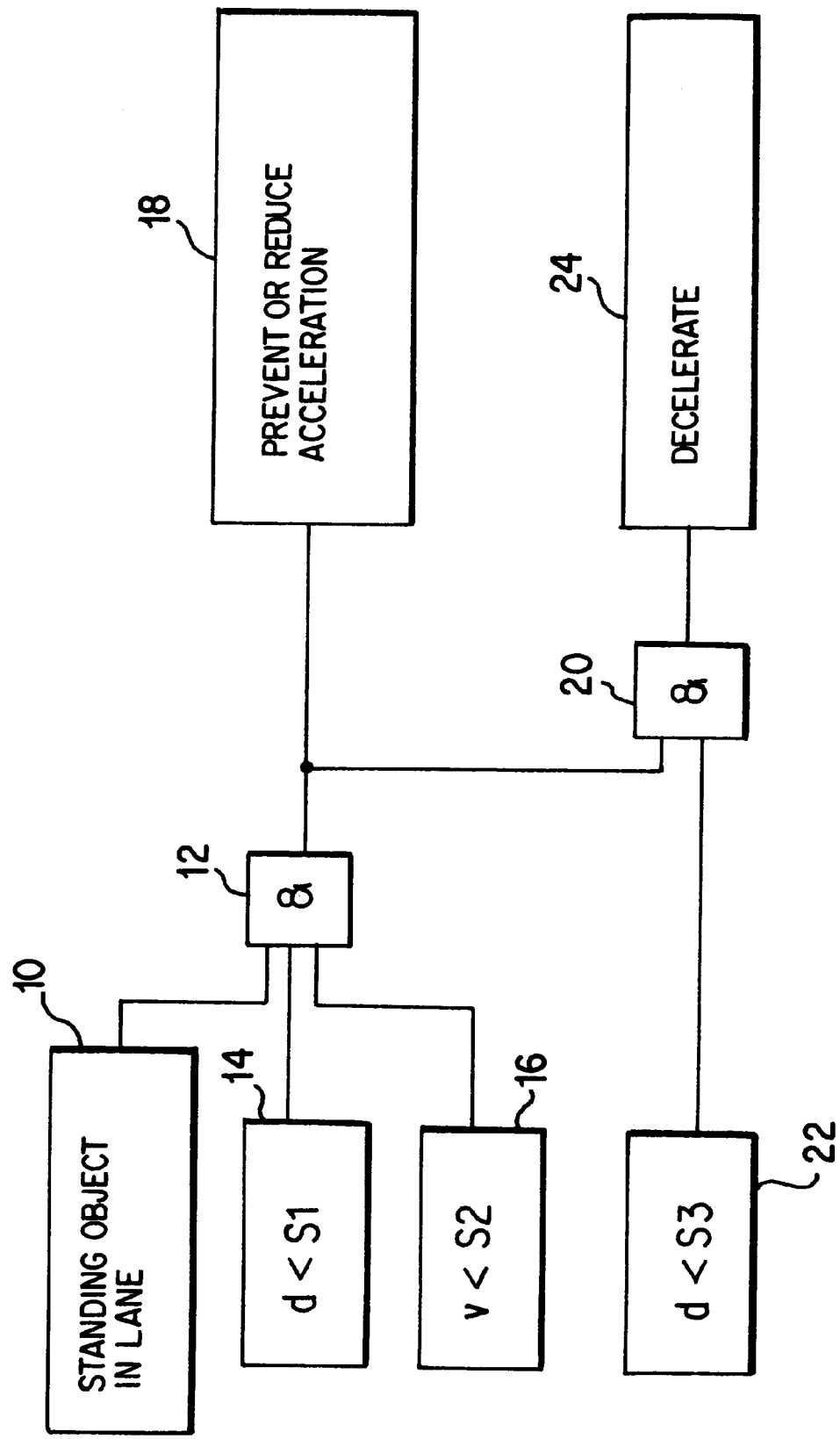

DISTANCE-RELATED ELECTRONICALLY CONTROLLED CRUISE CONTROL SYSTEM

BACKGROUND AND SUMMARY OF THE INVENTION

This application claims the priority of German Application No. 197 57 062.3, filed Dec. 20, 1997, the disclosure of which is expressly incorporated by reference herein.

The invention relates to a distance-related cruise control system and, more particularly, to a distance-related electronically controlled cruise control system for motor vehicles, in which, during a first regulating operation, a preset speed is basically maintained until a predetermined minimum distance to a target vehicle ahead is reached or undershot, and during which, during a second regulating operation following the reaching or undershooting of this preset minimum distance, speed regulation occurs in such fashion that the preset minimum distance is maintained by following the target vehicle at a regulated distance.

A cruise control system of this kind is known, for example, from U.S. Pat. No. 5,014,200. Known adaptive cruise control systems of this kind consist, in particular, of two components: (1) a speed regulator that essentially maintains a speed set by the driver; and (2) a sensor system to detect the distance from any vehicle that may be ahead.

The sensor system of this kind, for example, includes a radar object detection sensing system which usually ignores standing objects for the purpose of cruise control. The reason for this is that reliable evaluation of standing objects in terms of their relevance for cruise control is not possible based on the current state of the art in sensor technology, since detection by the sensing system does not include either identification of the type of object, nor its position relative to the lane in which the source vehicle is traveling. A standing object that is detected can be, for example, a traffic sign beside the road or a standing vehicle in the lane, which standing vehicle is relevant to cruise control.

In conventional distance-related adaptive cruise control systems, during a first regulating operation, a set speed is essentially maintained until a predetermined minimum distance from a vehicle ahead is reached or undershot. During a second regulating operation, following the reaching or undershooting of this predetermined minimum distance, a speed regulation is performed such that the predetermined minimum distance is maintained with the source vehicle following the target vehicle at a controlled distance.

When a source vehicle with such a cruise control system is following a target vehicle ahead (distance-regulated following) and the speed specified by the driver is higher than the actual speed reached while following at a regulated distance, if the vehicle traveling ahead veers or moves aside, it causes an acceleration of the source vehicle to the preset speed. This reaction, as a rule, conforms to the desire of the driver. However, if a standing object, especially a vehicle at rest, is in front of the vehicle that was previously ahead of the source vehicle, in other words in the lane, then the acceleration could result in a critical situation. This situation can occur in urban traffic in particular. Since this standing vehicle would be ignored by the regulating system in accordance with the prior art, the vehicle would be accelerated toward the standing vehicle in a manner that would be difficult for the driver to comprehend. This would result in the danger of the driver being irritated, and at least to an adverse effect on his comfort.

The goal of the invention is to therefore avoid the above disadvantages in a distance-related electronically controlled cruise control system.

This goal is achieved by a distance-related electronically controlled cruise control system for motor vehicles, in which, during a first regulating operation, a preset speed is basically maintained until a predetermined minimum distance to a target vehicle ahead is reached or undershot, and during which, during a second regulating operation following the reaching or undershooting of this preset minimum distance, speed regulation occurs in such fashion that the preset minimum distance is maintained by following the target vehicle at a regulated distance. In the event of detection of a standing object ahead of the target vehicle traveling ahead during the second regulating operation after the previously leading target vehicle veers aside during a transition from the second regulating operation to the first regulating operation, acceleration to the preset speed is prevented if the distance (d) to the standing object is below a first threshold (S1) and/or if the actual speed (v) is below a second threshold (S2).

An advantageous improvement on the invention is also described herein.

With the invention, recognized standing objects within a previously predicted lane of the source vehicle are included to a limited degree in a distance-regulated cruise control system. This is done in such form that the source vehicle is not accelerated toward such objects, i.e. the set acceleration is limited to zero or to a very low value. It is essential to the invention that at large distances to a standing object and/or at high actual speeds, standing objects continue to be ignored. However, at low speeds and/or at short distances to standing objects, i.e. when there is a high degree of detection reliability of an object relevant to the cruise control system, the usual acceleration upon the change from the second regulating operation to the first regulating operation is at least reduced. With a very short distance to standing objects, a deceleration is also preferably initiated.

This cruise control system according to the present invention prevents the driver from possibly interpreting a system-produced acceleration, occurring at the change from the second to the first regulating operation, as an unauthorized automatic acceleration toward an obstacle.

Other objects, advantages and novel features of the present invention will become apparent from the following detailed description of the invention when considered in conjunction with the accompanying drawings.

BRIEF DESCRIPTION OF THE DRAWING

The drawing shows, as an embodiment of the present invention, one possible logic circuit diagram which is integrated, for example, into an electronic control device for the cruise control system.

DETAILED DESCRIPTION OF THE DRAWING

If a standing object is detected in the vehicle lane of the cruise control equipped vehicle (source vehicle), especially after the target vehicle traveling ahead veers aside during the second regulating operation in the form of a distance-regulated following operation, it is determined whether the distance d to this standing object is below a first defined threshold S1 and the current speed v is less than a second defined threshold S2. Acceleration of the source vehicle is at least reduced or even prevented during the transition from the second regulating operation to the first regulating operation under these conditions.

However, if the distance d is smaller than a third defined threshold S3, with the third threshold S3 being lower than the first threshold S1, not only is acceleration prevented, but deceleration is initiated.

As shown in the logic circuit diagram of the drawing, a signal indicating whether or not an object is standing in the vehicle lane 10 is input to an AND gate 12. Also, the AND gate 12 receives inputs on whether the distance d to the standing object is below a first defined threshold S1 14 and whether the current speed of the vehicle v is less than a second defined threshold S2 16. If these three conditions occur, then the AND gate 12 outputs a signal to prevent or reduce the acceleration of the vehicle 18. This output is also provided to another AND gate 20 which receives as its other input information on whether the distance d is less than a third defined threshold S3 22. If this is also the case, then the AND gate 20 outputs a signal to decelerate the vehicle 24.

As noted above, the logic circuit can be integrated into an electronic control device for the cruise control system. Of course, it will be understood that the logic functions can also be implemented in a non-hardware manner using an appropriately programmed microprocessor of the engine control unit, or some combination of both hardware and software.

This embodiment constitutes the most advantageous example of the cruise control system according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A distance-related electronically controlled cruise control system for motor vehicle, in which, during a first regulating operation, a preset speed is basically maintained until a predetermined minimum distance to a target vehicle ahead is reached or undershot, and in which, during a second regulating operation following the reaching or undershooting of the predetermined minimum distance, speed regulation occurs in such fashion that the predetermined minimum distance is maintained by following the target vehicle at a regulated distance, wherein an event of detection of a standing object ahead of the target vehicle traveling ahead during the second regulating operation after the previously leading target vehicle veers aside, then during a transition from the second regulating operation to the first regulating operation, acceleration to the preset speed is prevented if at least one of a distance (d) to the standing object is below a first threshold (S1) and an actual speed (v) is below a second threshold (S2).

2. The distance-related electronically controlled cruise control system according to claim 1, wherein at the transition to the first regulating operation, a deceleration is initiated if the distance (d) to the standing object is below a third threshold (S3), with the third threshold (S3) being below the first threshold (S1).

3. A distance-related electronically controlled cruise control system for a motor vehicle, comprising:

an electronic control unit including a microprocessor, said microprocessor operating such that during a first regulating operation, a preset speed is basically maintained until a predetermined minimum distance to a target vehicle ahead is reached or undershot, and in which, during a second regulating operation following the reaching or undershooting of the predetermined minimum distance, speed regulation occurs in such fashion that the predetermined minimum distance is maintained by following the target vehicle at a regulated distance, and further operating such that in an event of detection of a standing object ahead of the target vehicle traveling ahead during the second regulating operation after the previously leading target vehicle veers aside, then during a transition from the second regulating operation to the first regulating operation, acceleration to the preset speed is prevented if at least one of a distance (d) to the standing object is below a first threshold (S1) and an actual speed (v) is below a second threshold (S2).

4. A distance-related electronically controlled cruise control system according to claim 3, wherein at the transition to the first regulating operation, a deceleration is initiated if the distance (d) to the standing object is below a third threshold (S3), with the third threshold (S3) being below the first threshold (S1).

5. A method for operating a cruise control system of a motor vehicle, the method comprising the acts of:

maintaining a preset speed during a first regulating operation until a predetermined minimum distance to a target vehicle is reached or undershot;

upon reaching or undershooting the predetermined minimum distance, maintaining the predetermined minimum distance by following the target vehicle at a regulated distance during a second regulating operation;

upon detecting a standing object ahead of the target vehicle during the second regulating operation when the target vehicle moves aside, preventing an acceleration to the preset speed during a transition from the second regulating operation to the first regulating operation if at least one of a distance to the standing object is below a first threshold and an actual speed is below a second threshold.

6. The method according to claim 5, further comprising the act of decelerating the vehicle at the transition to the first regulating operation if the distance to the standing object is below a third threshold, with the third threshold being below the first threshold.

* * * * *